Nov. 11, 1930.  A. A. MONTAPERT  1,781,593

SAFETY FUSE AND CIRCUIT TESTER

Filed April 25, 1927

Alfred A. Montapert
INVENTOR

BY Victor J. Evans
ATTORNEY

WITNESS:

Patented Nov. 11, 1930

1,781,593

UNITED STATES PATENT OFFICE

ALFRED A. MONTAPERT, OF LOS ANGELES, CALIFORNIA

SAFETY FUSE AND CIRCUIT TESTER

Application filed April 25, 1927. Serial No. 186,518.

This invention relates to electrical testing apparatus or devices and has for its object the provision of a novel device particularly designed for use by electricians and others for the purpose of testing fuses and circuits with absolute safety to the operator.

An important object of the invention is to provide a testing device which is adjustable so that the contact points thereof may be quickly and easily engaged with conductors at any distance apart, of course within certain limits, the device being actually of a dividers-like construction so as to permit movement of the arms thereof to bring the contact into engagement with the terminals of fuses or with conductors to be tested as to the completeness of the circuit in which they are embodied.

Still another object of the invention is to provide a testing device of this character embodying resistance coils which will act as safety means to prevent blowing out of fuses by short circuiting when circuits are tested or terminals bridged across, these coils also acting to cause the production of a spark when testing fuses, the spark being produced at one of the contacts upon disengagement thereof from the terminal of a fuse which has been bridged or shunted by the device.

An additional object of the invention is to provide a device of this character which is so well insulated that any possible danger of a shock to the operator will be avoided.

An additional object is to provide a device of this character which will be simple and inexpensive to make, easy to use, positive in action, efficient and durable in service, and a general improvement in the art.

With the above and other objects and advantages in view, such as lightness in weight, neatness and attractiveness in appearance and ready portability, the invention preferably consists in the details of construction and the arrangement and combination of parts to be hereinafter more fully described and claimed, and illustrated in the accompanying drawings, in which, Figure 1 is a view of the device, parts being in elevation and other parts in section.

Figure 1:
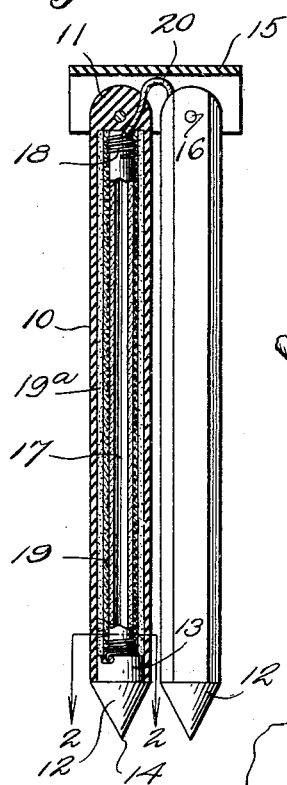

Referring more particularly to the drawings, I have shown the device as comprising a pair of elongated similar arm members 10, which are formed preferably of bakelite, though it is of course possible that some other suitable insulating material may be provided instead. These arm members 10 are of tubular shape, and are preferably hexagonal in cross section though it is clear that they could just as easily be cylindrical without in any way departing from the spirit of the invention. Each tubular member 10 is open at one end and has its other end closed, as indicated at 11, the open end having mounted therein a contact 12 which is preferably formed with a reduced portion 13 telescoped within the tubular member 10, the outer projecting portion terminating in a point 14. These contacts are preferably, though not necessarily, of copper, as this is a highly satisfactory material. The two members 10 are pivoted within a shield or channel member 15 by means of pivot pins 16 which are preferably of bakelite or other insulating material.

Located within each of the tubular members 10 is a supporting core 17 preferably of porcelain upon which is wound a resistance coil 18 of nichrome wire or its equivalent, this winding being coated with vitreous enamel indicated at 19, the whole being then embedded within sulphur 19ª confined within the tubular members 10. This structure constitutes the entire resistance unit within each of the members 10 and the two units are connected by means of a suitable flexible cable 20 located within the confines of the shield member 15. The construction is such that the device in its completed form resembles dividers and it will be observed that the two members 10 are capable of being swung upon their pivots 16 so as to bring the contacts 12 the desired distance apart for making a test.

Figure 3:
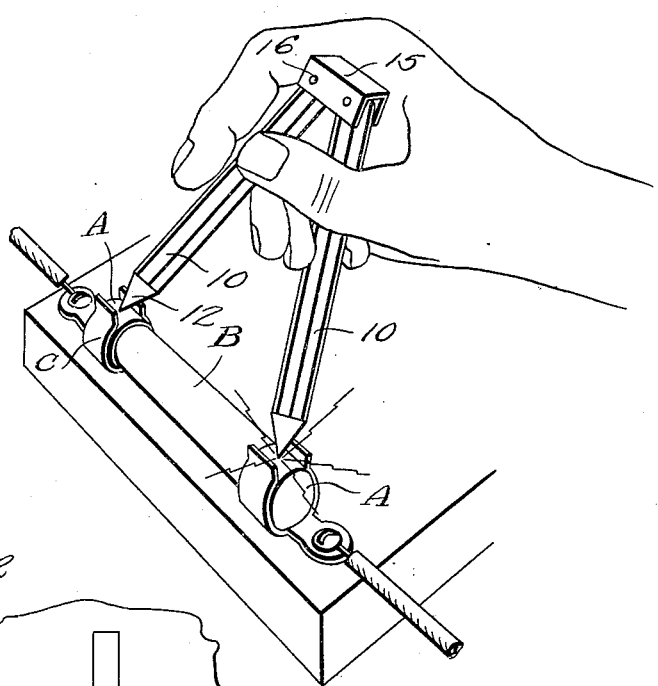
Figure 3 is a perspective view of the device showing it in use for testing a fuse.

The device is readily adapted for use in testing fuses and in this instance the operation is as disclosed in Figure 3 wherein the two arm members are shown spread apart to a sufficient extent that the contacts 12 may be brought into engagement with the terminals A of a fuse B, or with the clips C within which the terminals are engaged. When a test is made in this manner and one of the contacts disengaged from the terminal of the fuse previously engaged thereby, it will be apparent that a spark will indicate that the fuse has burned out.

Figure 4:
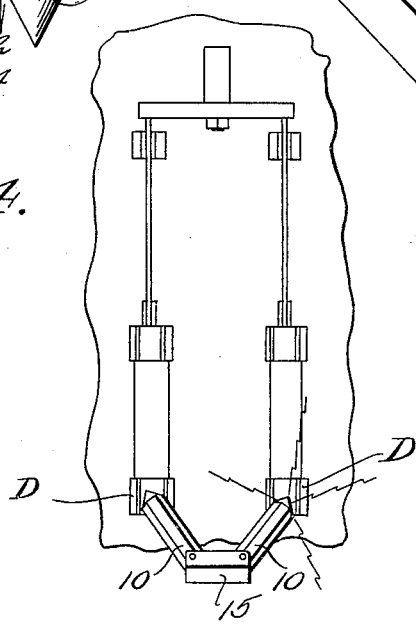
Figure 4 is a perspective view of the device showing it in use for testing a circuit.
Figure 2:
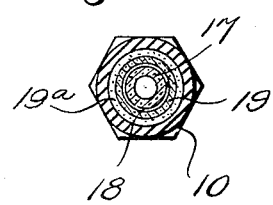
Figure 2 is a detailed cross sectional view taken on the line 2—2 of Figure 1.

The device is equally adapted for use in testing circuits, switches or other elements, and in such a case the operation is as disclosed in Figure 4 which shows the contacts as engaged with terminals D of a switch. Of course there is no limitation as to the switch inasmuch as any other conducting element may be tested in a similar manner, and it will be apparent that when the contacts 12 are engaged with conductors in a circuit, the device being consequently shunted across the circuit, a spark will be produced when the contact is disengaged with either of the conductors, thus indicating that a potential exists on the conductors. The device may be used in this manner for testing for phase failure in alternating current lines. Other uses will of course suggest themselves to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claims.

Having described the invention what is claimed is:—

1. A device of the character described comprising a pair of similar elongated tubular members each equipped at one end with a contact, a shield member pivotally connected with and confining the other ends of the members, and a resistance coil embedded and insulated within each member and connected with the associated and adjacent contact, the resistance coils being connected in series.

2. A device of the character described comprising a pair of elongated tubular members equipped at one end with contacts and having their other ends pivotally mounted within a containing member, a porcelain core within each member, a winding of high resistance wire upon each core, a coating of vitreous enamel upon each coil, a mass of sulphur embedding each coil within its tubular member, and such coils being connected in series.

3. A device of the character described comprising a pair of elongated tubular members of insulating material equipped at one end with contacts and having their other ends pivotally mounted within a containing member, a porcelain core within each member, a winding of high resistance wire upon each core, a coating of vitreous enamel upon each coil, a mass of sulphur embedding each coil within its tubular member, and such coils being connected in series, the device being of a dividers-like nature.

4. A testing device of the character described, comprising a dividers-like member including a pair of elongated tubular legs of insulating material, each provided at one end with a contact, a channel shaped member embracing and pivotally connected with the other ends of said tubular members, metallic contacts of conical form mounted at the free ends of said tubular members, and a resistance means located within each tubular member and connected with the adjacent contact, both of said resistance means being connected in series.

In testimony whereof I affix my signature.

ALFRED A. MONTAPERT.